United States Patent [19]

Kazusa et al.

[11] Patent Number: 4,649,979

[45] Date of Patent: Mar. 17, 1987

[54] BICYCLE TIRE

[75] Inventors: Susumu Kazusa; Masahiro Nagamine; Takayuki Tagawa, all of Kagawa, Japan

[73] Assignee: Mitsuboshi Belting Ltd., Hyogo, Japan

[21] Appl. No.: 721,626

[22] Filed: Apr. 10, 1985

Related U.S. Application Data

[63] Continuation-in-part of Ser. No. 539,906, Oct. 7, 1983, abandoned.

[30] Foreign Application Priority Data

Apr. 25, 1983 [JP] Japan .................................. 58-73626

[51] Int. Cl.$^4$ ........................... B60C 9/10; B60C 9/28
[52] U.S. Cl. ..................................... 152/527; 152/530; 152/538; 152/549; 152/554; 152/525; 152/563; 152/526
[58] Field of Search ........ 152/526, 527, 530, 531–538, 152/549, 552, 554, 556, 559, 563

[56] References Cited

U.S. PATENT DOCUMENTS 1,913,422  6/1933  Wikle .................................. 152/354
4,378,042  3/1983  Inae et al. ........................... 156/136
4,585,044  4/1986  Carrera et al. ....................... 152/549

OTHER PUBLICATIONS

"Bicycling", vol. XXII, No. 9, Nov./Dec. 1981, p. 1, advertisement by Wolber.
"Bicycling", vol. XXIV, No. 5, Jun. 1983, p. 185, advertisement by Ventura.

*Primary Examiner*—Lois E. Boland
*Attorney, Agent, or Firm*—Sughrue, Mion, Zinn, Macpeak & Seas

[57] ABSTRACT

In an open-sided bicycle tire having a plurality of carcass plies enclosing a pair of beads, and extending over the sidewalls and tread of the tire, at least one ply of a breaker is disposed between the plies of the carcass lying immediately under the tread.

4 Claims, 7 Drawing Figures

LOAD

BICYCLE TIRERELATED APPLICATION

This application is a continuation-in-part of application Ser. No. 539,906, filed Oct. 7, 1983 now abandoned.

BACKGROUND OF THE INVENTION

The present invention relates to an open-sided bicycle tire and more specifically to a tire having a plurality of carcass plies and a breaker ply intermediate said plies under the tread.

A bicycle tire is likely to be broken or punctured if its tread is pierced with a nail or any other pointed object. A conventional tire is shown in FIG. 2. The tire 1' has a breaker 7' disposed between a tread 6' and carcass plies 2a' to 2c'. The breaker 7' comprises a fabric composed of one or more plies of synthetic fibers and having high tensile strength. The breaker generally provides high resiliency. Such a tire has a number of drawbacks, including the following:

1. The breaker 7' is subjected to a large strain due to the difference in elasticity of the breaker from the tread rubber 6' and the carcass plies 2a' to 2c' if the tire 1' is deformed on the road surface. A strain is also produced in the breaker 7', since the adhesive strength between the tread rubber 6' and the breaker 7' differs from the adhesive strength between the breaker 7' and the carcass plies 2a' to 2c'. Further, the elasticity between the breaker 7' and the tread rubber 6', and the elasticity between the tread rubber 6' and the carcass plies 2a' to 2c' are different from each other, so that the breaker 7' is subjected to high strain. The breaker 7', eventually fails to withstand those repeated strains due to external force, and is damaged by fatigue sooner than the other parts of the tire. Of course, the fatigue, breakage is promoted if the difference in elasticity between the breaker and the carcass is large. This results in the separation of the breaker from the tread rubber due to a reduction in adhesive strength. The tread rubber 6' is subjected to the repeated strain which acts thereon not only radially, but also axially. This results in not only the separation between the tread rubber and the breaker, but also the separation between the tread rubber and the carcass plies in areas beyond the edges of the breaker, leading finally to the entire separation of the tread rubber which renders the tire totally unusable.

2. The earlier damage of the breaker 7' reduces its cutting resistance, and reduces the cutting resistance of the tire.

3. In an open-sided tire, it is impossible to employ a breaker width which is greater than the tread width, and it has been usual to limit it to a maximum of 0.9 times as large as the tread width. Therefore, the shoulders of the tire do not have any means for improving their cutting resistance.

SUMMARY OF THE INVENTION

It is an object of this invention to provide an open-sided bicycle tire having improved cutting and puncture resistance.

According to this invention, at least one ply of a breaker is disposed between a plurality of carcass plies immediately under a tread, the breaker having an elasticity not less than 1.5 times as high as that of the carcass. The breaker can be composed of various materials of high strength, and drastically improves the cutting and puncture resistance of the tire. The breaker adheres closely to the carcass. The tire of this invention has a very long life.

The foregoing and other objects, features and advantages of the invention will be apparent from the following more particular description of a preferred embodiment of the invetnion, as illustrated in the accompanying drawings.

DETAILED DESCRIPTION OF THE INVENTION

Figure 1:
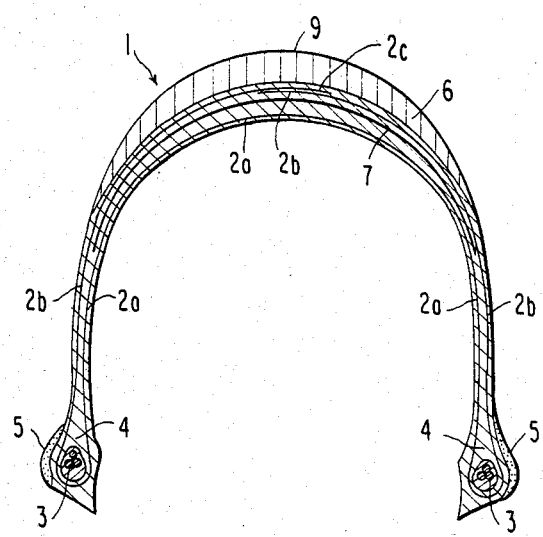
FIG. 1 is a cross sectional view of an opensided tire embodying this invention.

Referring to FIG. 1, a bicycle tire 1 has a pair of beads 3 embedded in a pair of bead rubber layers 4 at the opposite edges thereof. The beads 3 are comprised of ordinary bead wires, or ropes obtained by twisting organic or inorganic fibers, such as aromatic polyamide, glass or carbon fibers. The beads 3 are covered by a pair of two-ply screen carcass plies 2a and 2b composed of biased screen cloth bonded adhesively to organic or inorganic fiber cords and coated with rubber. The outer surfaces of the carcass 2 are provided with a pair of edge covers 5 at the edges of the tire 1. The carcass 2 is folded at the edges of the tire to form three plies 2a, 2b, and 2c beneath the tread. The tire of this invention is an open-sided tire having a sidewall which is not covered by rubber, but in which the screen carcass plies 2b are exposed. In other words, at the side walls of the open side tire, side rubber is extremely small in thickness and the carcass is almost exposed at the side wall portions. A layer of tread rubber 6 having a crescent shaped cross section and an appropriately patterned surface is provided with an appropriate thickness on the tread of the tire.

According to a salient feature of this invention, a reinforcing breaker 7 is disposed between the two plies 2a and 2b of the carcass and forms a part of the tread of the tire, and the breaker 7 used in the invention provides an elasticity not less than 1.5 times as high as that of the carcass. The breaker 7 is usually formed from a fabric made of aromatic polyamide such as Kevlar (product of du Pont) and Teijinconex (product of Teijin), high strength fabric such as nylon, polyester, vinylon, rayon or glass fibers, or metallic materials such as a wire net or a plurality of steel wires. It has a width which is 0.6 to 1.5 times the width of the tread 6, and is disposed circumferentially between the two plies 2a and 2b of the carcass.

If the breaker 7 has a width which is less than 0.6 times as large as that of the tread, it is too narrow to provide a satisfactory reinforcing effect for the tread in the event it is pierced with a nail or any other pointed object. If its width is over 1.5 times as large as that of the tread, it extends over the sidewalls of the tire and is unnecessarily wide.

In the tire of this invention, instead of disposing the breaker between the tread and the carcass as in the conventional tire, the high elastic breaker is disposed between the carcass plies, and the elasticity of the breaker is not less than 1.5 times as large as that of the carcass in order to enhance mechanical strength. The breaker is usually comprised of a single ply, but may also be comprised of two or three plies. It is disposed between the plies of carcass, and provides a greater reinforcing effect than the breaker in a conventional tire which is disposed between the tread and the carcass.

The breaker is generally less free to adapt itself to deformation than the carcass of the screen construction, since it has a dense structure composed of intertwined threads running crosswise and lengthwise to stop penetration of a nail or any other pointed object. It easily gets fatigued, and ceases to provide the necessary function. This is particularly the case in the event the breaker is disposed between the tread rubber and the carcass of the screen type construction which differ greatly from each other in elasticity. This difference in elasticity causes the separation of the breaker from the tread rubber and the carcass. Particularly, if the breaker has an elasticity of not less than 1.5 times as large as that of the carcass, the above mentioned drawback becomes remarkably acknowledged.

Figure 2:
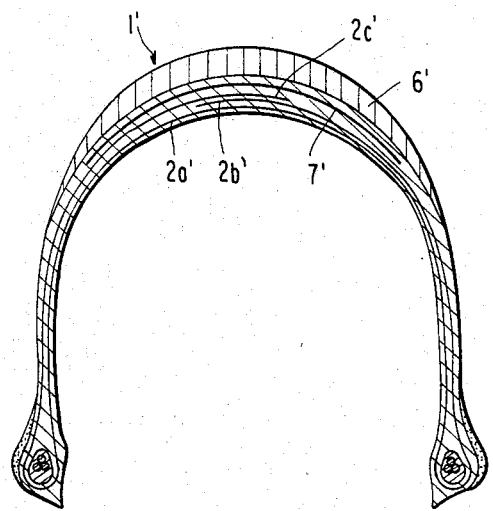
FIG. 2 is a cross sectional view of the conventional open-sided tire.

A number of tests were conducted to ascertain the advantages of the tire according to this invention, as will hereinafter be described by way of examples. The tests were conducted on a tire embodying this invention and a conventional tire of the type shown in FIG. 2 which were both 27 inches in diameter and 1.25 inches in width.

EXAMPLE 1

Figure 3:
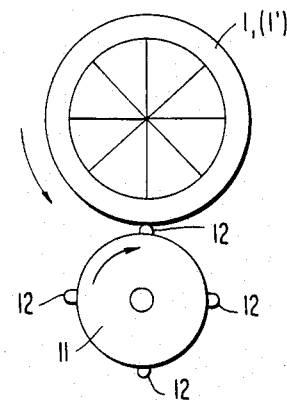
FIG. 3 is a front elevational view of an apparatus for testing the fatigue of a breaker in the tire.

The fatigue of the breaker was examined by a testing machine comprising a drum 11 and a plurality of shock bars 12 projecting from the periphery of the drum and spaced substantially equally from one another along the circumference of the drum, as shown in FIG. 3. The machine imparted vibration and impact to the tire which was caused to turn on the drum. Three samples of breakers were prepared as shown in Table 1 below. These breakers were arranged as shown in FIG. 1 (Present Invention) and FIG. 2 (Conventional Tire).

| Tire in accordance with the present invention (1) | Conventional tire (1') | Kinds of breaker |
| --- | --- | --- |
| A | A' | breaker having elasticity 1.2 times as high as that of carcass |
| B | B' | breaker having elasticity 1.5 times as high as that of carcass |
| C | C' | breaker having elasticity 2.0 times as high as that of carcass |

The tire 1 of this invention and the conventional tire 1' were tested at a speed of 45 km/h and a load of 70 kgf, while the same internal pressure was maintained in both of the tires. According to the conventional tires 1', the fabric breakers in the tires B' and C' were seriously fatigued when these had travelled a distance of 3,000 km on the drum, even though no fatigue portion was seen in the conventional tire A'. Particularly, in the conventional tire C' wherein difference in elasticity between the breaker and the carcass was the largest, the breaker was come loose along half of its length, resulting in its separation from the tread rubber. When the tires were travelled a distance of 5,000 km on the drum, the fatigue was acknowledged in the tire A', while in the tires B' and C', fatigue extended to the whole breakers, and substantially separation from the tread rubber occurred along their length. The complete separation of the tread rubber occurred when the tire 1' has travelled a distance of 6,000 km on the drum. In summary, according to the conventional structure, the larger the difference in elasticity between the carcass and the breaker, the faster the fatigue promotes. Particularly, if the elasticity of the breaker is not less than 1.5 times as high as the elasticity of the carcass, the conventional tires were easily fatigued at an early stage, so that these tires do not survive long in actual use. On the other hand, the breaker in the tires A, B and C of this invention did not show any fatigue or wear even when it had travelled a distance of 10,000 km. There was, of course, no separation of the tread rubber. Thus, the tests showed the superiority of the tire of this invention with respect to both its fatigue resistance and the inseparability between the tread rubber and the breaker.

The only difference between the tire of this invention and the conventional tire resides in the position of the breaker. They are considered to be substantially equal in the cutting or fracture resistance of the individual components. Therefore, the cutting resistance of the tire as a whole depends on the effects which the position of the breaker may have on the power of the tire to absorb the energy which it will receive from an external source, such as a pointed piece of rock or metal, or a fragment of glass.

It is generally true that a tire having a breaker formed from a reinforcing material having high cutting resistance is high in rigidity, and therefore, low in the power of enveloping a piece of rock, metal or the like over which it passes. This reduction in enveloping power means a reduction in the power of the tire to absorb energy from an external source. The tread of the tire has a greater surface pressure, and the tread, breaker and carcass need to bear a larger amount of energy. This increase in energy creates the local concentration of stress in the breaker, and it often prevents the breaker from providing any satisfactory cutting resistance. Therefore, an increase in cutting resistance calls for an increase in the power of the tire to absorb energy from an external source, i.e., a restriction or a reduction in its enveloping power.

Figure 4:
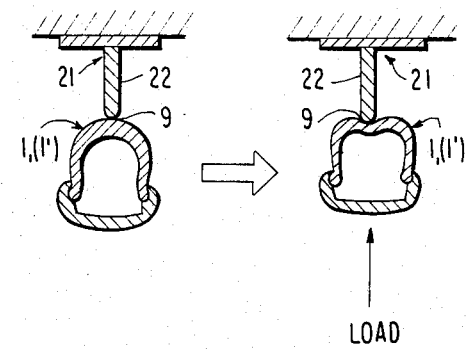
FIG. 4 is a view illustrating a test conducted by an Amsler testing machine for determining the enveloping force of the tire.

It is considered that the rate at which a tire sinks when a force is applied locally thereto is proportional to its enveloping power which is an index of its power to absorb energy from an external source. Its sinking rate, i.e., the deformation which may be caused by a pointed piece of metal or the like which is about to pierce through the tire, is correlated to its enveloping power and is proportional thereto. Therefore, tests were conducted by an Amsler testing machine as shown in FIG. 4 to compare the enveloping power of the tire according to this invention with that of the conventional tire.

EXAMPLE 2

Figure 5:
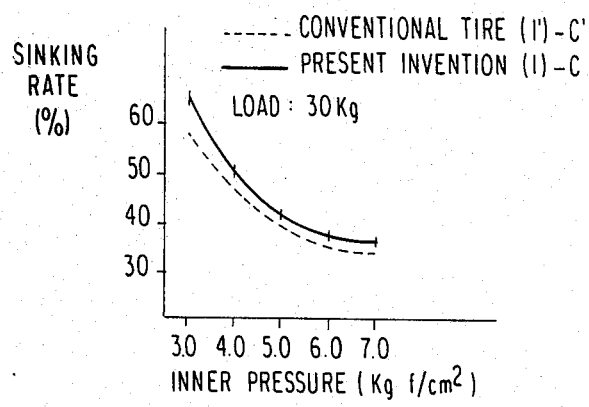
FIG. 5 is a graph showing the sinking rate of each of a tire according to this invention and a conventional tire in relation to the internal pressure applied by a plunger.

The Amsler testing machine 21 had a plunger 22 having a diameter of 8 mm and satisfying the requirements of JIS k 6302 - 6.6. The tire 1 of this invention and the conventional tire 1' were each pressed against the plunger 22 at the center 9 of its crown under a load of 30 kg, while the same internal pressure was maintained therein. The results are shown in FIG. 5. FIG. 5 shows comparison between the conventional tire C' and the tire C of the present invention. The graph shows a higher sinking rate of the tire according to this invention irrespective of its internal pressure. This teaches that the tire of this invention has a greater enveloping power, a higher power of absorbing energy from an external source and higher cutting resistance. The superiority of the tire according to this invention in cutting resistance is believed to be manifested more prominently with a prolonged period of use in view of its drastic superiority in fatigue strength which was testified by the tests hereinabove described with reference to FIG. 3.

Additional tests were conducted to ascertain the superiority of the tire according to this invention in cutting resistance, as will hereinafter be described.

EXAMPLE 3

Figure 6:
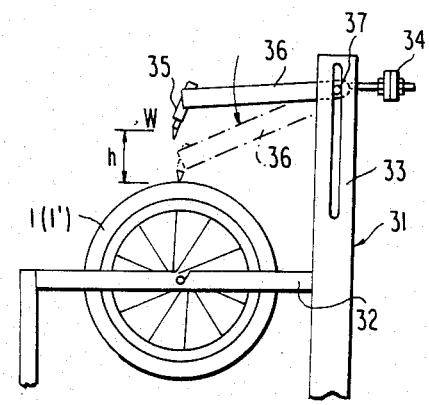
FIG. 6 is a front elevational view of a machine for testing the cutting resistance of a tire.
Figure 7:
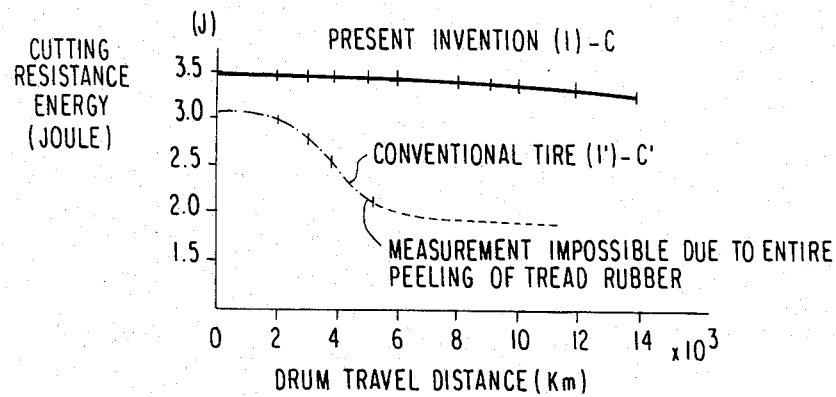
FIG. 7 is a graph comparing the tire of this invention and the conventional tire in cutting resistance energy versus a drum travel distance.

The cutting resistance tests were conducted on the tire C of this invention and the conventional tire C' which were both mounted on a rim and filled with air to a regular internal pressure. Each tire was caused to travel a predetermined distance on the drum, and set on a mount 32 in a cutting resistance testing machine 31 as shown in FIG. 6. The machine 31 included a cantilevered arm 36 supported for vertical movement on a post 33, and carrying a load adjusting weight 34 at its rear end and a downwardly directed cutter 35 at its front end. The cutter 35 had a blade width of 30 mm, and a tapered end having an angle of about 30°. The arm 36 was vertically rotated about a pin 37 to bring the cutter 35 into abutment on the tire 1 or 1'. The drop height (h) of the cutter and the load (W) thereby applied were measured to determine the amount of energy causing the puncture of the tire upon penetration of the cutter 35 through the tread. The energy (V) is equal to the load (W) multiplied by the height (h), i.e., $V = Wh$. The results are shown in FIG. 7. A greater amount of energy, of course, means higher cutting resistance. The graph shows the superiority of the tire according to this invention from the very beginning of its travel on the drum and a constant level of cutting resistance which the tire of this invention maintained with an increase in the distance of its travel. Thus, this invention also provides solutions the drawbacks of the conventional tire which has hereinbefore been pointed out.

According to this invention, the width of the breaker is not limited by the width of the tread, since it is disposed between the plies of carcass. The breaker may extend beyond the edges of the tread to reinforce the shoulders of the tire, and even its sidewalls. The tests which have hereinabove been described also confirmed that the width of the breaker could be enlarged to a maximum of 1.5 times as large as that of the tread, and that if the breaker was formed in two or more plies, no problem would arise if the width of the upper ply was not over 0.8 times as large as that of the lower ply. The breaker disposed between the plies of carcass can improve the cutting resistance of the tire without impairing its neat appearance.

While the invention has been particularly shown and described with reference to a preferred embodiment thereof, it will be understood by those in the art that various changes in form and details may be made therein without departing from the spirit and scope of the invention.

What is claimed is:

1. In an open-sided bicycle tire including a plurality of plies of carcass enclosing a pair of beads, and positioned inside the sidewalls and tread of said tire, the improvement comprising a breaker having at least one ply disposed between said plies of carcass and lying under said tread, said breaker having an elasticity not less than 1.5 times as high as that of said carcass, and being formed of one of fabric and metallic materials.

2. A tire as set forth in claim 1, wherein said breaker comprises a woven cloth of fibers selected from the group consisting of aromatic polyamide, nylon, polyester, vinylon, rayon, and glass fibers.

3. A tire as set forth in claim 1, wherein said metallic material is selected from the group consisting of a wire net and a plurality of steel wires.

4. A tire as set forth in claim 1, wherein said breaker has a width which is 0.6 to 1.5 times as large as that of said tread.

* * * * *